United States Patent [19]

Hosoya et al.

[11] Patent Number: 5,355,938
[45] Date of Patent: Oct. 18, 1994

[54] TEMPERATURE CONTROL DEVICE

[75] Inventors: Tsutomu Hosoya; Katsuhiro Inaba; Toru Akiyama; Shigeru Fujita, all of Numazu, Japan

[73] Assignee: Toshiba Machine Co., Ltd., Tokyo, Japan

[21] Appl. No.: 982,425

[22] Filed: Nov. 27, 1992

Related U.S. Application Data

[63] Continuation of Ser. No. 747,482, Aug. 16, 1991, abandoned, which is a continuation of Ser. No. 494,321, Mar. 16, 1990, abandoned.

[30] Foreign Application Priority Data

Mar. 20, 1989 [JP] Japan .................................. 1-66385

[51] Int. Cl.⁵ ............................................ F25B 29/00
[52] U.S. Cl. ........................................ 165/12; 165/26; 165/30; 236/46 F; 236/78 D; 236/78 A; 425/144; 264/40.6
[58] Field of Search ...................... 236/75, 46 F, 78 A, 236/78 D; 165/12, 26, 30; 425/144; 264/40.6

[56] References Cited

U.S. PATENT DOCUMENTS

| | | | |
|---|---|---|---|
| Re. 31,903 | 6/1985 | Faillace | 165/30 |
| 3,229,754 | 1/1966 | Hoag | 165/30 |
| 4,272,466 | 6/1981 | Harris | 165/30 |
| 4,548,259 | 10/1985 | Tezuka et al. | 165/30 |
| 4,784,213 | 11/1988 | Eager et al. | 165/30 |
| 4,843,576 | 6/1989 | Smith et al. | 165/30 |

*Primary Examiner*—John K. Ford
*Attorney, Agent, or Firm*—Young & Thompson

[57] ABSTRACT

A temperature control device with high accuracy and stability comprising a heating device and a cooling device which are controlled by separate control circuits for performing proportional control, integral control, derivative control and the like. A ratio of energy supply periods to predetermined control periods is thereby varied, on the basis of a controlled variable calculated from direction, size, change velocity and the like of deviation of actual temperature of a controlled medium from desired set temperature so as to control heating and cooling energy supplies for the heating and cooling devices. The heating energy and cooling energy supplies for the heating and cooling devices can be separately controlled by means of different proportional bands.

1 Claim, 4 Drawing Sheets

TEMPERATURE CONTROL DEVICE

This application is a continuation, of application Ser. No. 07/747,482, filed Aug. 16, 1991, now abandoned, which is a continuation of Ser. No. 07/494,321, of Mar. 16, 1990, now abandoned.

FIELD OF THE INVENTION

This invention relates to a temperature control device with heating and cooling means, particularly to the temperature control device in which heating and cooling control actions are performed with separate proportional bands by which a control system or process is controlled by separate heating and cooling actions.

BACKGROUND OF THE INVENTION

Conventionally the temperature control device of this type has been used for temperature control of an injection molding machine which is equipped with a heating cylinder and a cooling jacket around the cylinder.

Referring to FIG. 6 one example will be described hereinafter.

In FIG. 6, a heating cylinder 10 comprises a screw 12 which is capable of reciprocating and rotating motion. A heater 14 of a heating means and a cooling jacket 16 of a cooling means are provided on the peripheral surface of the heating cylinder 10. A thermocouple 18 for temperature detection is disposed at each temperature control zone where the heater 14 and the cooling jacket 16 are provided. The heater 14 is connected through a switch 22 to a power supply 20. The cooling jacket 16 is connected through an electromagnetic valve 26 to a cooling medium supply source 24 such as a blower for supplying cooling air.

The switch 22 and the electromagnetic valve 26 are respectively connected to a temperature controller 28.

The temperature controller 28 comprises a temperature control circuit 30 for setting proportional bands which determine heating and cooling energies for heating and cooling medium in the heater 14 and the cooling jacket 16, respectively. The temperature controller may include other necessary means such as arithmetic processing units.

The term "proportional band" will be briefly described hereinafter in connection with a typical example in which a controlled object and a control unit constitute a feedback system.

When the temperature of a heavy oil as a controlled medium is controlled to a constant value by means of a heater in the feedback system, the control unit consists of a detection means for detecting oil temperature, a control means for comparing the oil temperature with a desired value by means of a controller and generating an appropriate signal, and an operation means for equalizing the oil temperature to the desired value.

In this case, a feedback circuit is formed between the controlled medium (heater) and the control unit.

Then, in the detection means, the thermocouple, the heavy oil and the oil temperature act as a primary element, a controlled medium and a controlled variable, respectively. The control means may consist of a power unit and a final control element, in which vapor and vapor flow rate are regarded as a control agent and a manipulated variable, respectively.

In such a feedback system, a proportional positioning action which is generally referred to as P-action can be determined by the following equations:

$$-(\mu - \mu_v) = K_p (x - v) \quad (1)$$

or $$-(\mu - \mu_v) = \frac{1}{S} (x - v) \quad (2)$$

where x=controlled variable; v=desired value; $\mu_v$=position of final control element. Namely, it is noted that the controlled variable is in proportion to a position of the final controlled element (manipulated variable).

In the above equations, $K_p$ is referred to as a proportional sensitivity or proportional gain and S which is represented as of an inverse of $K_p$ is referred to as proportional band.

Namely, the proportional band is a percentage representation of a range of the controlled variable in which the final control element is controlled over all manipulated variable range in proportional relation, relative to all scale range of a controller. For example, when the scale range of the controller is 0° C. to 200° C. and the temperature as a controlled variable varies by 40° C. in response to all manipulated variable of a valve as a final control element, the proportional band is 20%.

FIG. 7 shows such a relation between controlled variable, manipulated variable and proportional band.

Even though any load change may occur in the P-action, there is no change in relation between the controlled variable and the position of the final control element.

Namely, only one position of control valve corresponds to a given recording pen position of the controller.

Accordingly, the recording pen position representing the controlled variable corresponds to a desired position, i.e., a set point only when a special load is given. Generally, the recording pen is allowed to be deviated from the set point even under balanced condition. The deviation is referred to as residual deviation or offset.

A general proportional positioning type controller has an adjusting mechanism referred to as a manual reset. The adjusting mechanism acts such that the pen position corresponds to the set point under balanced condition by moving the proportional band shown in a graph of FIG. 5(a) in the direction of the abscissas according to changes in process condition as illustrated in FIG. 5(b).

For example, using a controller having a scale mark of 0° C. to 200° C. in which the proportional band is 20% (namely 40° C. range), an oil temperature controlled to a set point of 150° C. whereupon an opening of a valve through which a vapor is passed is 50% and the system is under balanced condition. In such a case, if a flow rate of oil is doubled, the valve must be opened until its opening reaches 75% in order to obtain a necessary quantity of heat. In this case, the 75% valve opening causes the recording pen to be moved down to indicate 140° C. In order to obtain the 75% valve open rate and eliminate an offset without temperature drop, the manual reset mechanism moves the proportional band to the right such that the valve opening increases from 50% to 75%.

As the proportional band becomes narrow, namely, as proportional sensitivity becomes increased, control operation is close to on-off operation. To this end, the offset is increased while a cycling is reduced.

Therefore, P-action is rendered correctable in size and safe in operation by controlling the proportional band and safe in operation. Generally, it can be used for not only a process which has slow load fluctuation and small or medium reaction rate, but also an astatic process such as on-off operation.

Further, FIG. 7 shows a typical energy balance in which a temperature is controlled by controlling heating and cooling energy supplies.

Namely, heating or cooling energy is varied from 0% to 100% in accordance with predetermined control period and deviation of an actual temperature from desired set temperature.

In this case, energy supply by heating means and energy supply by cooling means are often not equal for controlling a heat quantity of the controlled medium which is subjected to temperature control. In an injection molding machine illustrated in FIG. 6, energy supply by heating means is larger than that by cooling means. As shown in FIG. 7, heating energy and cooling energy which are supplied when the actual temperature is deviated from the desired set temperature, are respectively represented as H and C.

The H and C are varied depending upon heating and cooling capacity of the injection molding machine. Also, the energies are varied under such conditions as amounts of internal calorific power and of heat radiation to the external caused due to shearing action of a screw upon resin's plasticization and melting.

In FIG. 7, 100% cooling energy $C_1$ is supplied at the temperature $(t+d)°$ C., where the desired set temperature is $t°$ C. In temperature range from $(t-d)°$ C. to $(t+d)°$ C., heating energy and cooling energy are respectively supplied in different amounts.

For example, at temperature $(t-e)°$ C., heating energy $H_2$ and cooling energy $C_2$ are respectively supplied in different amounts.

Therefore, respective supplies of heating energy and cooling energy are kept to be balanced at temperature $(t+f)°$ C. at which heating energy $H_3$ and cooling energy $C_3$ are equal to each other.

In this case, an offset of $f°$ C. is generated at proportional action control. In order to eliminate the offset, Pi control which is a combination of proportional control and integral control can be used.

In a controlled object having both heating means and cooling means, temperature controls for heating means and cooling means are performed by using one temperature control circuit.

In such controls as P (proportional)-action control, Pi (proportional plus integral)-action control, PiD (proportional plus integral plus derivative)-action control and the like, the ratio of energy supply period to predetermined control period is varied on the basis of controlled variable to be calculated from size or change velocity of the deviation of the actual temperature of the controlled medium from the desired set temperature. Therefore, both control constant such as P, i, D and the proportional band for control are identically controlled.

However, a conventional temperature control device has the following disadvantages.

Namely, dispite that the aforementioned offset can be eliminated by the Pi-action control, a hunting effect over a large temperature range relative to the desired temperature $t°$ C. is generated, as shown in FIG. 4, due to heating energy $H_3$ and cooling energy $C_3$ supplied in different amounts during constant control period.

Further, in the controlled medium having both heating means and cooling means, there is often a considerable difference in volume between heating load, i.e., a temperature-rise characteristic due to heating energy supplied by heating means, and cooling load, i.e., a temperature-drop characteristic due to cooling energy supplied by cooling means. For this reason, a stable temperature control can not be easily performed by using a common temperature control circuit.

SUMMARY OF THE INVENTION

Accordingly, it is an object of the present invention to provide a temperature control device with high accuracy and stability which is capable of limiting hunting at the desired control temperature to a small width even in a controlled medium having a large difference between heating load and cooling load.

In order to realize the object, a temperature control device according to the invention comprises heating and cooling means and separate control circuits for the heating means and the cooling means for performing proportional control, integral control, derivative control and the like by which ratio of energy supply period to predetermined control period is varied so as to control heating energy supply and cooling energy supply for the respective means on the basis of a controlled variable calculated from direction, size, change velocity and the like of deviation of actual temperature of a controlled medium from a desired set temperature. In addition, the device according to the invention can separately control the heating means and the cooling means by using different proportional bands.

In this case, the different proportional bands are formed of first and second ones for separately controlling the heating means and the cooling means. Preferably, the desired value, i.e., set point in the proportional bands can be set separately.

Also, the different proportional bands having different widths can be set separately.

Further, the control periods for heating energy supply and cooling energy supply can be set separately and independently.

On the other hand, one temperature set point for heating and cooling control can be obtained from internal arithmetic by using predetermined relational expression.

In such a case, one temperature set point for heating and cooling control may be obtained from the internal arithmetic by selecting respective coefficients for one set of relational expressions or one set selected from a plurality of the sets. Moreover, the temperature set point for the heating and cooling control may be obtained from the internal arithmetic by using measurement results of actual temperature change during optionally selected period.

According to a temperature control device of the invention, separate proportional bands for heating and cooling control are independently set.

In view of the energy balance used for controlling a set temperature to a desired value, respective supplies of heating energy and cooling energy are controlled so as to become smaller without excess load thereof at a temperature set point. Therefore, overshooting of heating and cooling energy upon temperature control is reduced to effectively minimize hunting at the desired temperature for heating and cooling control.

In this case, if a control period and a temperature set point are separately set for heating and cooling control, the extent of hunting can be limited more effectively.

BRIEF DESCRIPTION OF THE DRAWINGS

Preferred embodiments of a temperature control device according to the present invention will be described hereinafter in detail with reference to the accompanying drawings, in which like reference numerals refer to like parts without a detailed explanation for the respective parts in conventional heating and cooling proportional bands shown in FIG. 7, and in which.

PREFERRED EMBODIMENTS OF THE INVENTION

Figure 1:
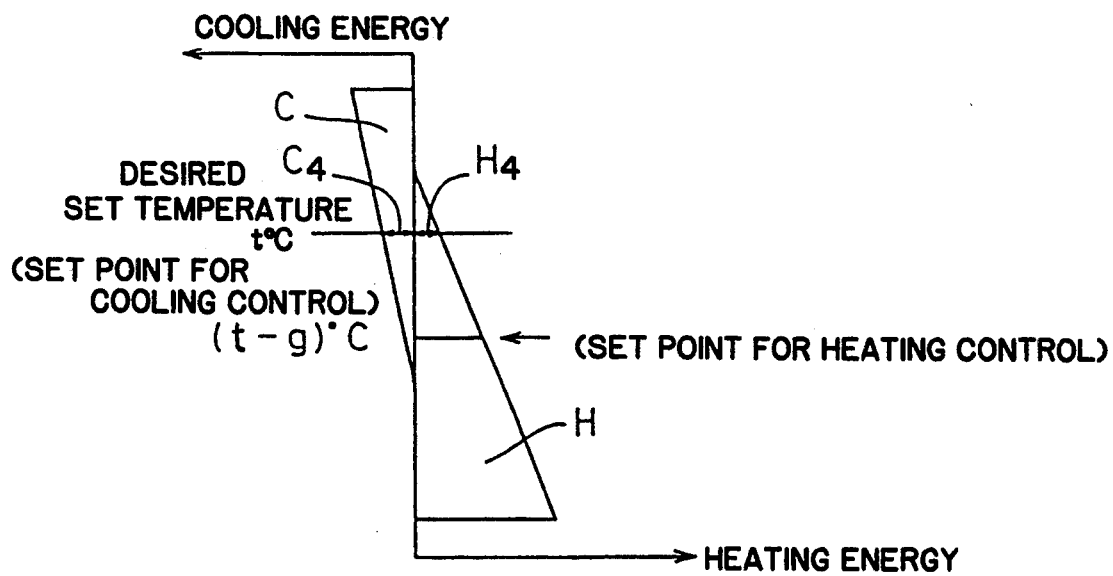
FIG. 1 is a typical diagram of heating and cooling proportional bands according to a first embodiment of the present invention.

FIG. 1 shows separate proportional bands set for heating and cooling controls according to a first embodiment of the present invention.

Referring now to FIG. 1 a first proportional band H for heating control and a second proportional band C for cooling control are separately set. For these separate proportional bands H and C shown in FIG. 1, start and end points of heating and cooling energy supplies are varied independently while respective set points differs by g° C. from each other.

Figure 7:
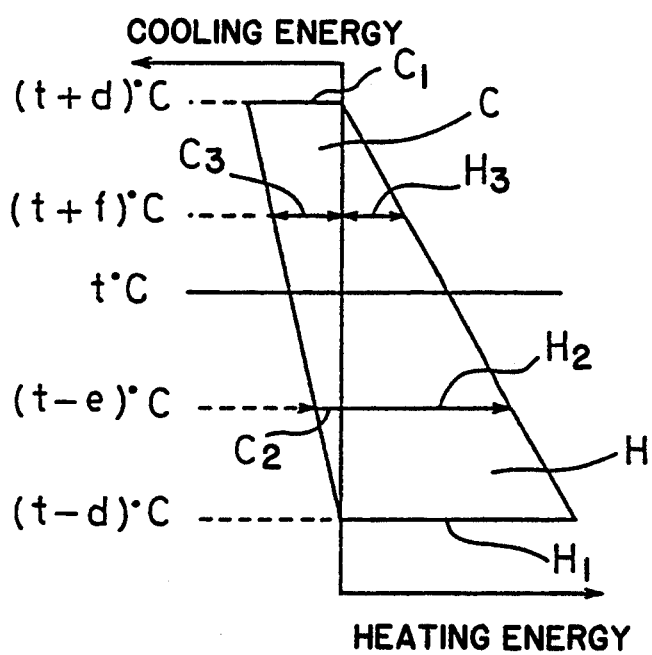
FIG. 7 is a typical diagram of conventional heating and cooling proportional bands.

In this case, heating energy $H_4$ and cooling energy $C_4$ supplied at a balanced set point are less than heating energy $H_3$ and cooling energy $C_3$ shown in FIG. 7. Therefore, the respective heating and cooling energy supplies can be more effectively balanced.

Figure 2:
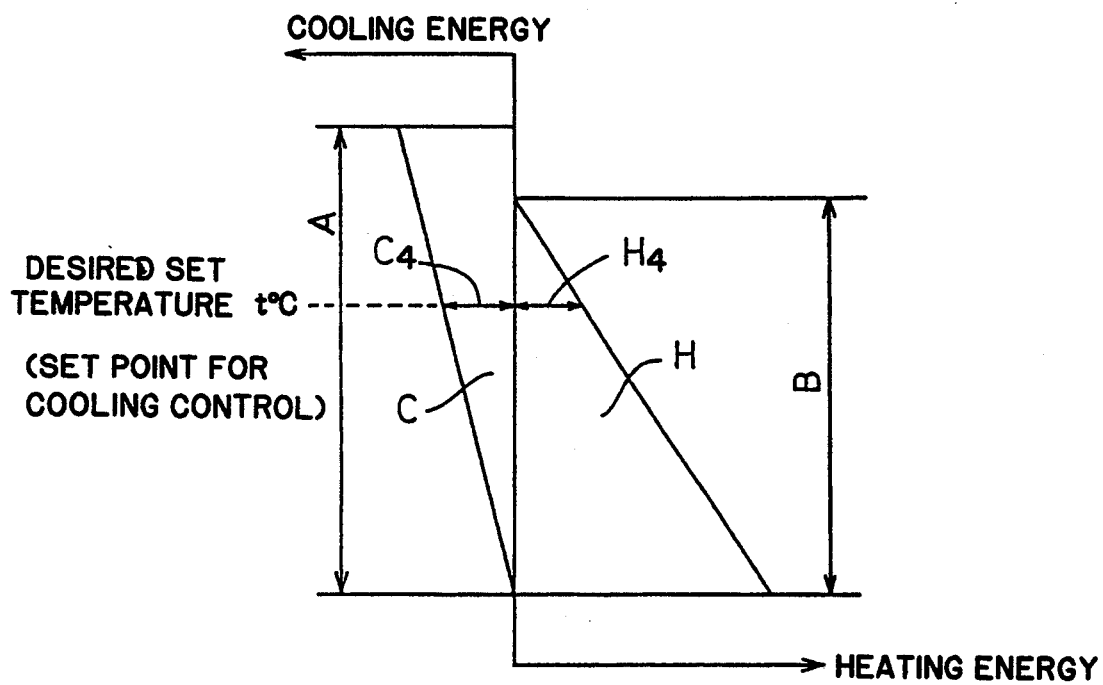
FIG. 2 is a typical diagram of another set of heating and cooling proportional bands according to a second embodiment of the present invention.

FIG. 2 shows a second embodiment of the invention, comprising a first proportional band C having a width A and a second proportional band H having a width B which differs from the width A.

Namely, the second proportional band H is changed in width in order to equalize cooling energy $C_4$ with heating energy $H_4$, so that a good balance of heating and cooling energy supplies can be obtained.

Figure 3A:
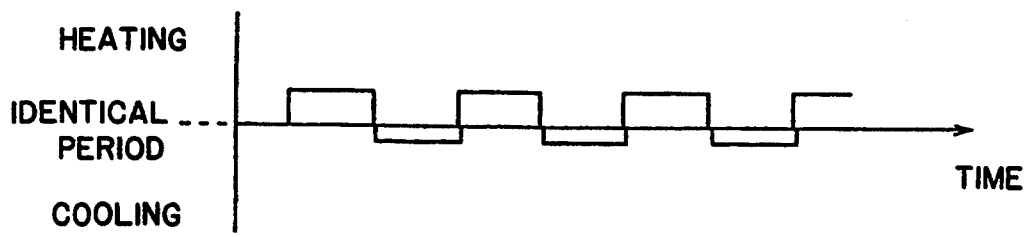
FIG. 3(a) is a diagram of conventional heating and cooling control periods.
Figure 3B:
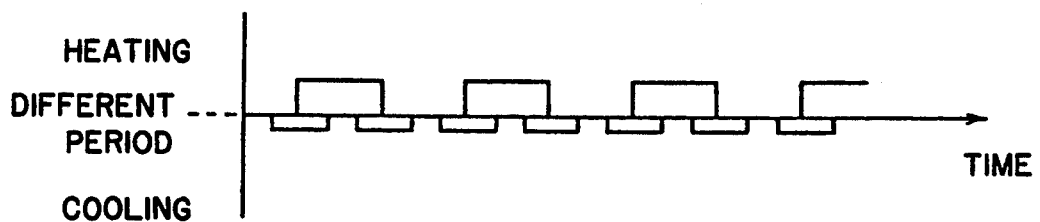
FIG. 3b is a diagram of separately predetermined heating and cooling control periods according to a third embodiment of the present invention.

FIG. 3b shows a third embodiment of the invention, in which two different supply periods for heating and cooling energy are illustrated.

FIG. 3(a) shows the case where heating energy and cooling energy are supplied at an identical period in a conventional manner. FIG. 3(b) shows another case where heating energy and cooling energy are respectively supplied at different periods.

In FIG. 3(b) diagram, adoption of different supply periods for heating and cooling energy can realize a good balance of heating and cooling energy supplies.

Figure 4:
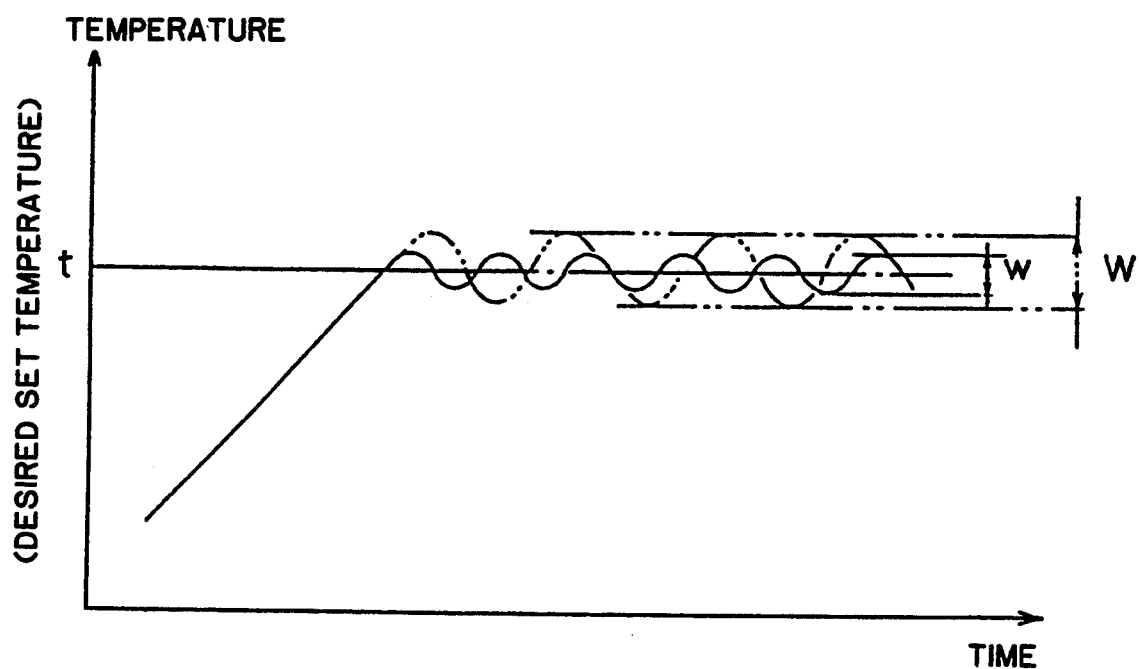
FIG. 4 is a graph of a temperature control characteristic.
Figure 5A:
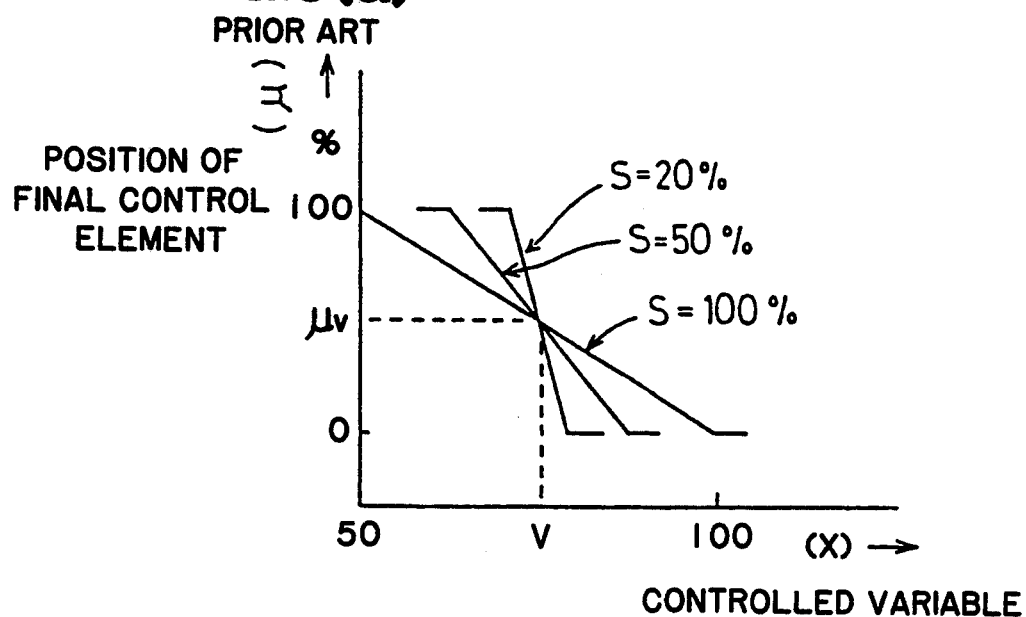
FIGS. 5(a) and 5(b) are diagrams of generally known heating and cooling proportional bands.
Figure 5B:
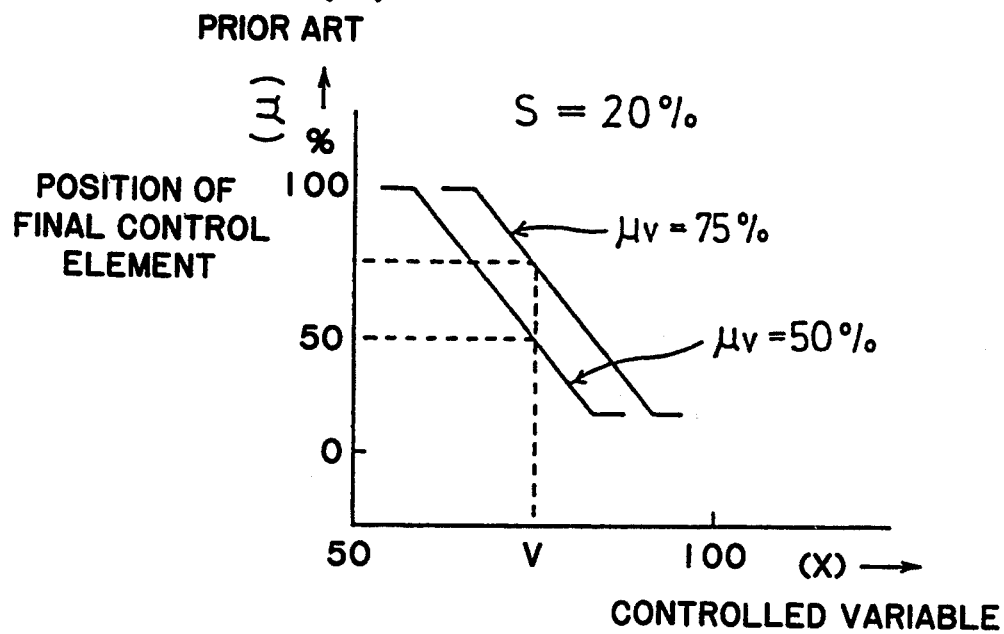
Figure 6:
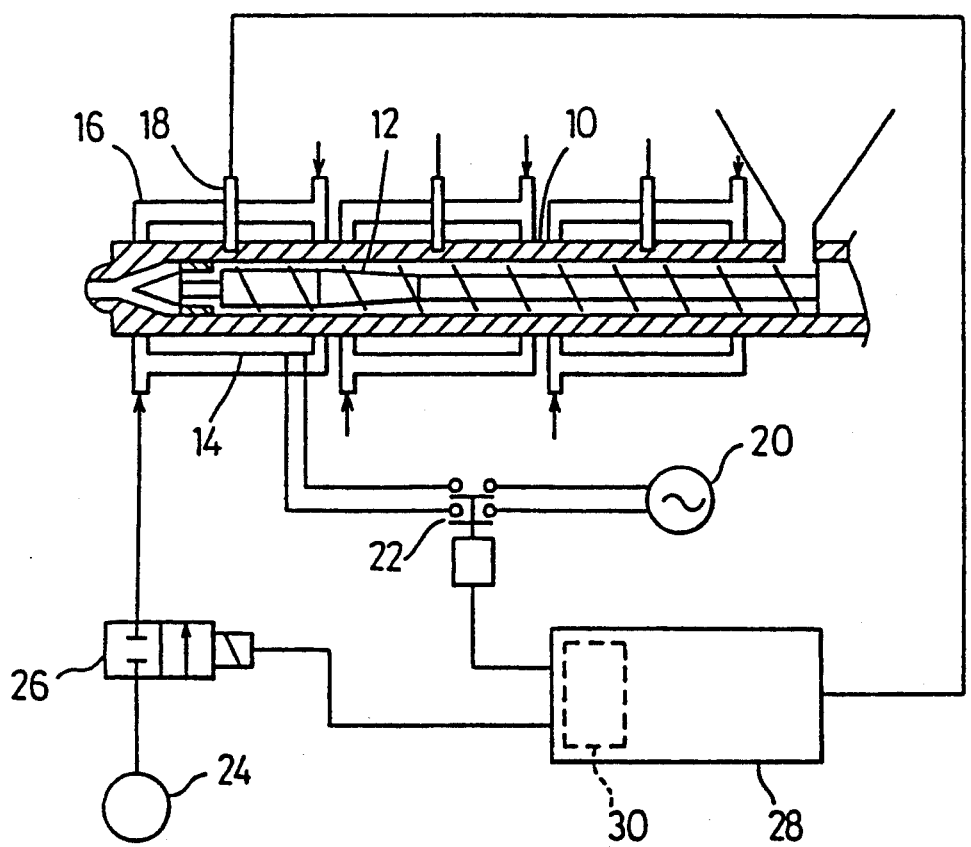
FIG. 6 is a schematic diagram of a temperature control device according to the present invention, which is used for a heating cylinder for an injecting molding machine.

Thus separately set first and second proportional bands can perform heating and cooling controls such that balanced heating and cooling energies $H_4$ and $C_4$ for the set temperature are less than the heating energy $H_3$ and the cooling energy $C_3$ in FIG. 7 to be supplied in the conventional manner. To this end, both heating and cooling energy supplies can reach better balanced level so that a hunting width w according to the present invention becomes smaller as compared with a conventional width W illustrated in phantom line in FIG. 4.

Further, in a fourth embodiment of the invention, each set point for heating and cooling controls can be determined relative to a common desired point at balanced energy supplies by using a pair of relational expressions (1) described below.

In a fifth embodiment of the invention, each set point for the heating and cooling controls can be determined relative to one common temperature set point at balanced energy supplies from an arithmetic after optionally selecting relational expressions to be used from memorized one of or a plurality of relational expressions (2-1) and (2-2) and selecting coefficients for the selected relational expressions.

$$t1 = t0 + \alpha \tag{1}$$
$$t2 = t0 - \beta$$

$$t1 = k1 \cdot t0 + \alpha 1 \tag{2-1}$$
$$= k2 \cdot t0 + \alpha 2$$

$$= kn \cdot t0 + \alpha n$$

$$t2 = k1' \cdot t0 - \beta 1 \tag{2-2}$$
$$t2 = k2' \cdot t0 - \beta 2$$

$$= kn' \cdot t0 - \beta n$$

where
t1=set point of heating temperature;
t2=set point of cooling temperature;
t0=common temperature set point;
$\alpha - \alpha n, \beta - \beta n$=constant; and
k1−kn, k1'−kn'=coefficient.

Moreover, in a sixth embodiment of the invention, the temperature set points can be determined from an internal arithmetic based on a measurement result of fluctuation in actual temperature within time period optionally determined.

Although the present invention has been described hereinbefore with its preferred embodiments, it will be appreciated that many variations and modifications may be made without departing from the spirit and scope of the invention. In addition, the present invention cannot be limited to used for a heating cylinder body may be applied to a wide variety of similar devices such as a heating roller for circulating a heating medium thermally controlled by heaters and cooling water to objects of temperature control, an extruding die for plastic molding, a mold for injection molding and the like.

As is obvious from the aforementioned embodiments, a temperature control device according to the invention comprises different proportional bands for separately controlling heating means and cooling means so as to separately control heating and cooling energy supplies to the heating means and the cooling means by using separate control circuits in which proportional control, integral control, differential control and the like are carried out on the basis of arithmetic results in direction, size, variation, velocity and the like of deviation of actual temperature of a controlled medium from desired set temperature. To this end, overshooting of heating and cooling are reduced upon the temperature control so that a hunting width at desired temperature can be controlled to be small as possible.

In this case, if control periods and temperature set points are separately selected for heating and cooling controls, the hunting width can be restricted.

What is claimed is:

1. A temperature control device comprising heating means and cooling means for separately heating and cooling a process chamber, first and second separate control circuits for performing proportional control, integral control and derivative control, said first and second control circuits independently controlling said heating means and said cooling means, respectively, to vary a ratio of energy supply periods to predetermined control periods on the basis of a controlled variable calculated from a detected deviation of actual temperature of a controlled medium from a desired reference temperature, thereby to control heating and cooling energy supplies for said heating and cooling means, said heating means and said cooling means being separately controlled by first and second proportional bands specific to said first and second control circuits, respectively, each of said proportional bands comprising a set point which is separately and independently set, said predetermined control periods for said heating energy supply and said cooling energy supply being also set separately and independently, said first and second control circuits operating both said heating means and said cooling means simultaneously when said actual temperature deviates from said desired temperature by less than a predetermined amount.

* * * * *